(12) United States Patent
Sakumoto

(10) Patent No.: US 7,270,373 B2
(45) Date of Patent: Sep. 18, 2007

(54) CHILD CAR SEAT

(75) Inventor: Masayuki Sakumoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/503,942

(22) Filed: Aug. 15, 2006

(65) Prior Publication Data

US 2007/0046086 A1   Mar. 1, 2007

(30) Foreign Application Priority Data

Aug. 24, 2005  (JP) ............................ 2005-242896

(51) Int. Cl.
*B60N 2/42*   (2006.01)
(52) U.S. Cl. ................. 297/216.11; 297/250.1
(58) Field of Classification Search .......... 297/216.11, 297/250.1, 216.1
See application file for complete search history.

(56) References Cited

U.S. PATENT DOCUMENTS

| 3,645,548 | A | * | 2/1972 | Briner ................... 297/216.11 |
| 5,551,751 | A | * | 9/1996 | Sedlack et al. ........ 297/256.13 |
| 5,722,719 | A | * | 3/1998 | Glomstad ............... 297/216.11 |
| 6,454,350 | B1 | * | 9/2002 | Celestina-Krevh et al. .......... 297/216.11 |
| 6,513,870 | B1 | | 2/2003 | Takizawa |
| 6,641,211 | B2 | | 11/2003 | Takizawa |
| 6,746,080 | B2 | * | 6/2004 | Tsugimatsu et al. ... 297/256.13 |
| 6,871,908 | B2 | | 3/2005 | Takizawa |
| 2004/0232747 | A1 | | 11/2004 | Yamazaki et al. |

FOREIGN PATENT DOCUMENTS

| EP | 1 300 280 A2 | 4/2003 |
| EP | 1300280 | * 9/2003 |
| FR | 2706827 | * 12/1994 |
| JP | S52-129117 | 10/1977 |
| JP | S53-38026 | 4/1978 |
| JP | S58-63147 | 4/1983 |
| JP | H01-89061 | 6/1989 |
| JP | 3054768 | 4/2000 |

* cited by examiner

*Primary Examiner*—Milton Nelson, Jr.
(74) *Attorney, Agent, or Firm*—Manabu Kanesaka

(57) ABSTRACT

A child car seat includes a seat body, in which a child sits, and a base for supporting the seat body, such that the seat body is tiltable in a reclining direction. When forward force larger than a predetermined level is applied to a weight from deceleration larger than a predetermined level generated by a frontal collision of a vehicle or the like, the seat body is operable to move in an upright direction. The child car seat has no possibility to damage a latch mechanism while the child car seat is mounted on a car seat.

6 Claims, 10 Drawing Sheets

CHILD CAR SEAT

BACKGROUND OF THE INVENTION

The present invention relates to child car seats disposed on vehicle seats, and more specifically, it relates to child car seats capable of rotating seat bodies thereof in an upright direction when forward deceleration larger than a predetermined level is applied to the child car seats while the seat bodies are disposed so as to face backward and upward.

A technique of a child car seat is disclosed in FIG. 3 and paragraph numbers 0022 to 0024 in Japanese Unexamined Patent Application Publication No. 2003-63291. The child car seat includes locking means that is released when forward deceleration larger than a predetermined level is applied to the child car seat such that a seat body thereof, which is disposed so as to face backward and upward, can be rotated in an upright direction.

The rotation of the seat body in the upright direction when large deceleration is applied to the child car seat due to a frontal collision of a vehicle or the like can reduce the shock transmitted to a child sitting in the child car seat.

In the child car seat according to an embodiment shown in FIG. 3 of the Japanese Unexamined Patent Application Publication No. 2003-63291, the seat body is supported by a connecting portion. When forward force larger than a predetermined level is applied to the child car seat, the connecting portion is broken such that the rotation of the seat body in the upright direction is started.

Some child car seats are strongly pressed against car seats when the child car seats are firmly mounted on the car seats. In such cases, excessive force is applied to the connecting portion of this known technique, and the connecting portion can be ruptured. Also, the connecting portion can be broken if the child car seat is dropped. Once the connecting portion is broken as described above, the child car seat is no longer useable.

An object of the invention is to provide a child car seat capable of solving the above-described problem and having no possibility of being damaged while it is mounted on a car seat.

SUMMARY OF THE INVENTION

According to one aspect of the invention, a child car seat includes a seat body, a base for supporting the seat body such that the seat body is tiltable in a reclining direction, a locking device for preventing the seat body from tilting, and a releasing device for releasing the lock applied by the locking device and allowing the rotation of the seat body in an upright direction when forward deceleration larger than a predetermined level is applied to the child car seat while the seat body is disposed so as to face backward and upward.

In addition, the releasing device comprises a weight moving forward in response to the deceleration, and the lock is released by the transfer of the weight.

According to another aspect, the locking device includes a locking bar extending in the transverse direction of the seat body and a latch body provided for the base and engaging with the locking bar, and the engagement of the latch body and the locking bar is released in response to the transfer of the weight caused by the deceleration.

In addition, according to another aspect, the locking device includes a spring for urging the latch body in a direction so as to engage with the locking bar.

Another aspect includes reciprocating device for reciprocating the locking bar in the longitudinal direction thereof, wherein the locking bar retracts so as to move from a position where the locking bar is engaged with the latch body to another position where the engagement of the locking bar and the latch body is released.

The child car seat according to the present invention is disposed such that the seat body faces backward and upward, and a child is seated upward on the seat body. When deceleration larger than a predetermined level is applied to the child car seat during a frontal collision or the like, the weight is moved such that the lock of the seat body is released, and the seat body moves in an upright direction such that the shock applied to the child is reduced.

According to the present invention, even if the lock applied by the locking device is released by an excessive pressure caused when the child car seat is mounted, the weight can be returned to the original position and the child car seat can be recovered to the original state.

Furthermore, in one aspect, the locking bar is firmly retained by the latch body during normal operation. When forward deceleration larger than a predetermined level is applied to the child car seat during a frontal collision or the like, the latch body moves such that the lock is released in response to the transfer of the weight. Afterwards, the latch body and the locking bar can be engaged with each other again by the weight returning to the original position.

According to another aspect, when force corresponding to the deceleration acting on the weight exceeds the urging force of the spring, the latch body moves in a direction for releasing the engagement, and the engagement of the latch body and the locking bar is released. Therefore, the deceleration against which the seat body is moved in an upright direction can be set by selecting spring constants and the like.

Furthermore, according to another aspect, the locking bar can be retracted from the engaging position by the reciprocating device. Thus, the reclining angle of the seat body can be adjusted.

DETAILED DESCRIPTION OF PREFERRED EMBODIMENTS

Now the invention will be described in detail hereinafter with reference to the accompanied drawings which illustrate the preferred embodiments of the invention.

Figure 1:
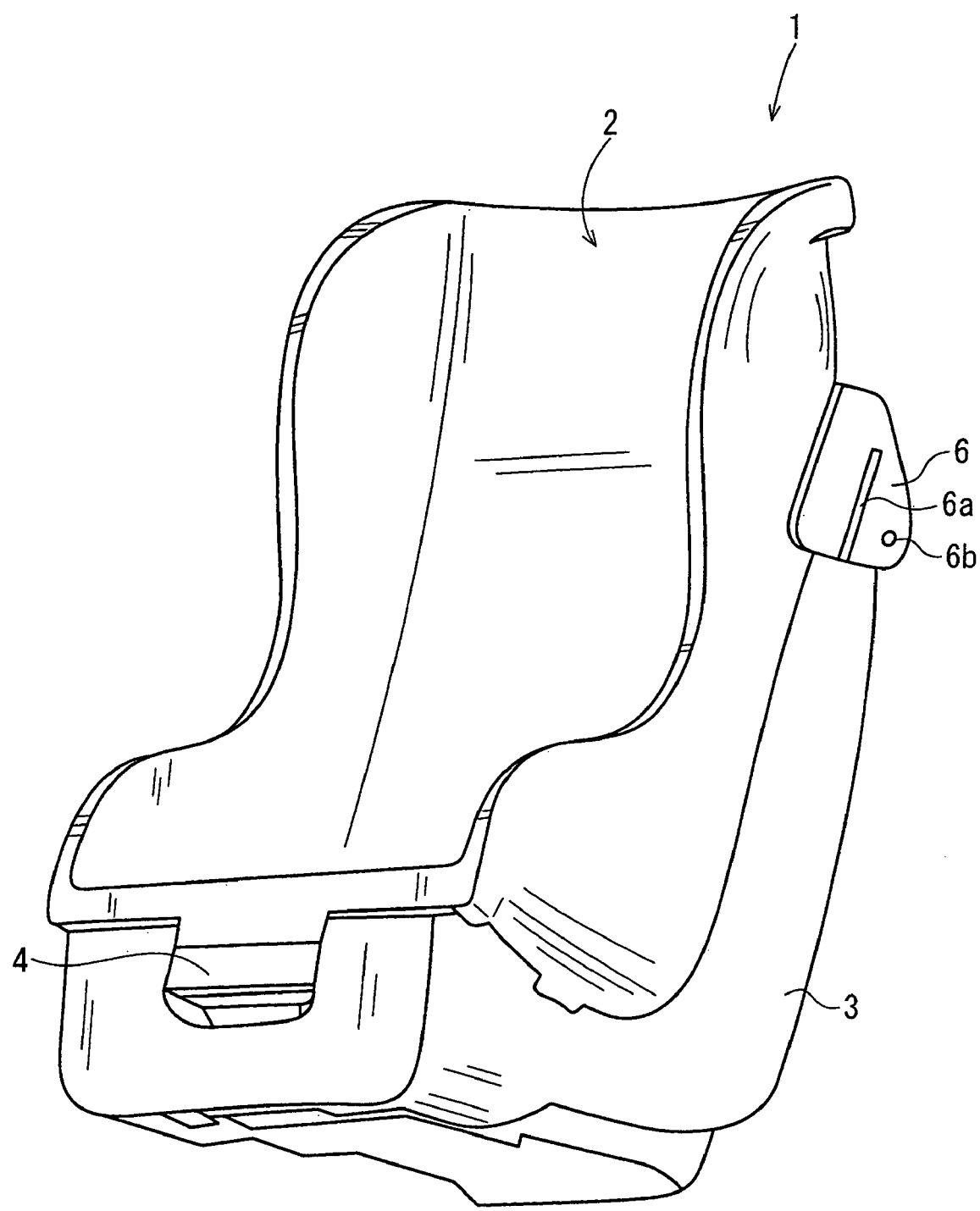
FIG. 1 is a perspective view of a child car seat.
Figure 4:
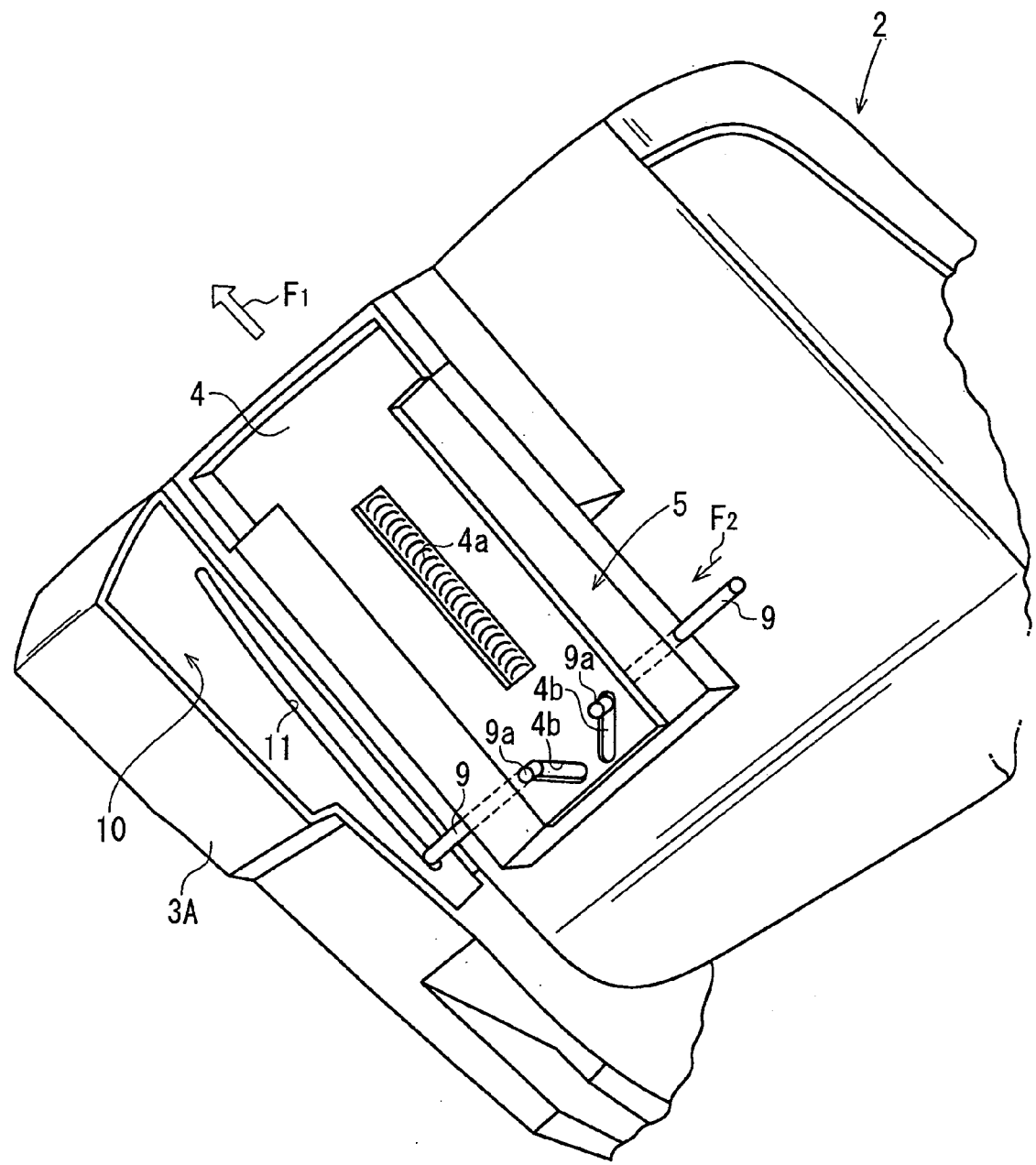
FIG. 4 is a partly enlarged view of the child car seat according to FIG. 1, excluding a bottom cover of an operation unit.
Figure 5:
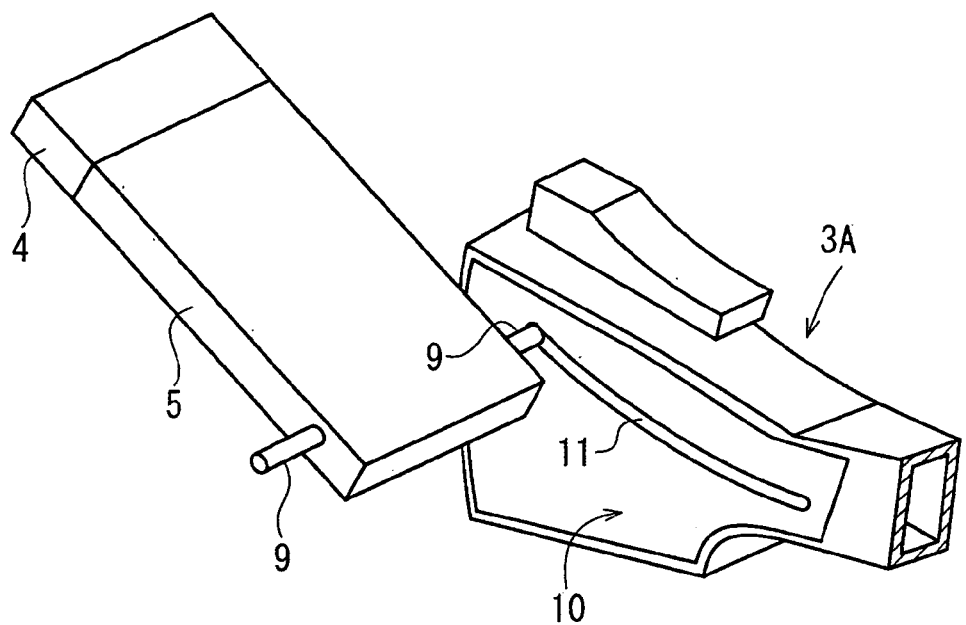
FIG. 5 is a perspective view illustrating an engaging state of the base and a locking bar of the seat body according to the car seat of FIG. 1.
Figure 6:
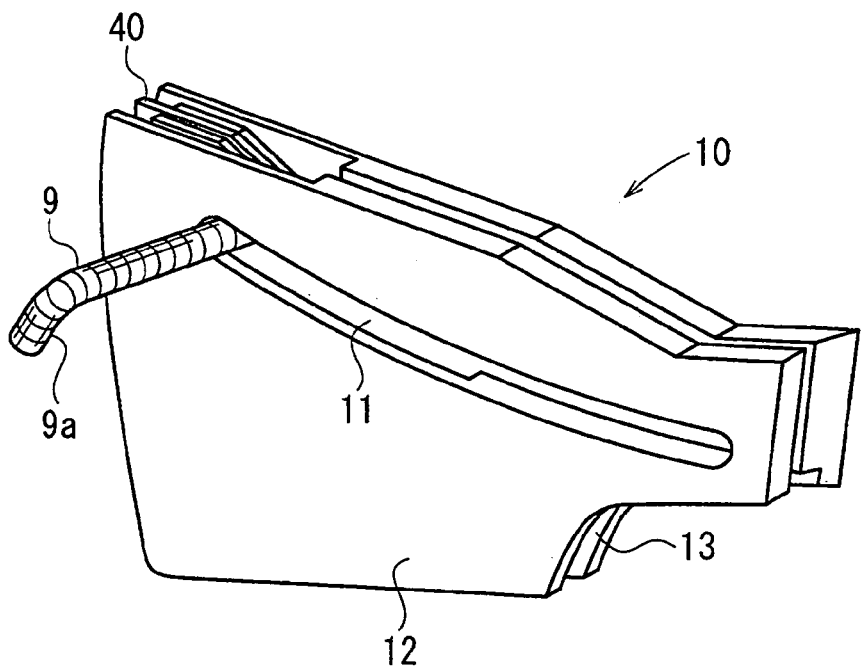
FIG. 6 is a perspective view illustrating an engaging state of a locking unit and the locking bar of the car seat according to FIG. 1.
Figure 7:
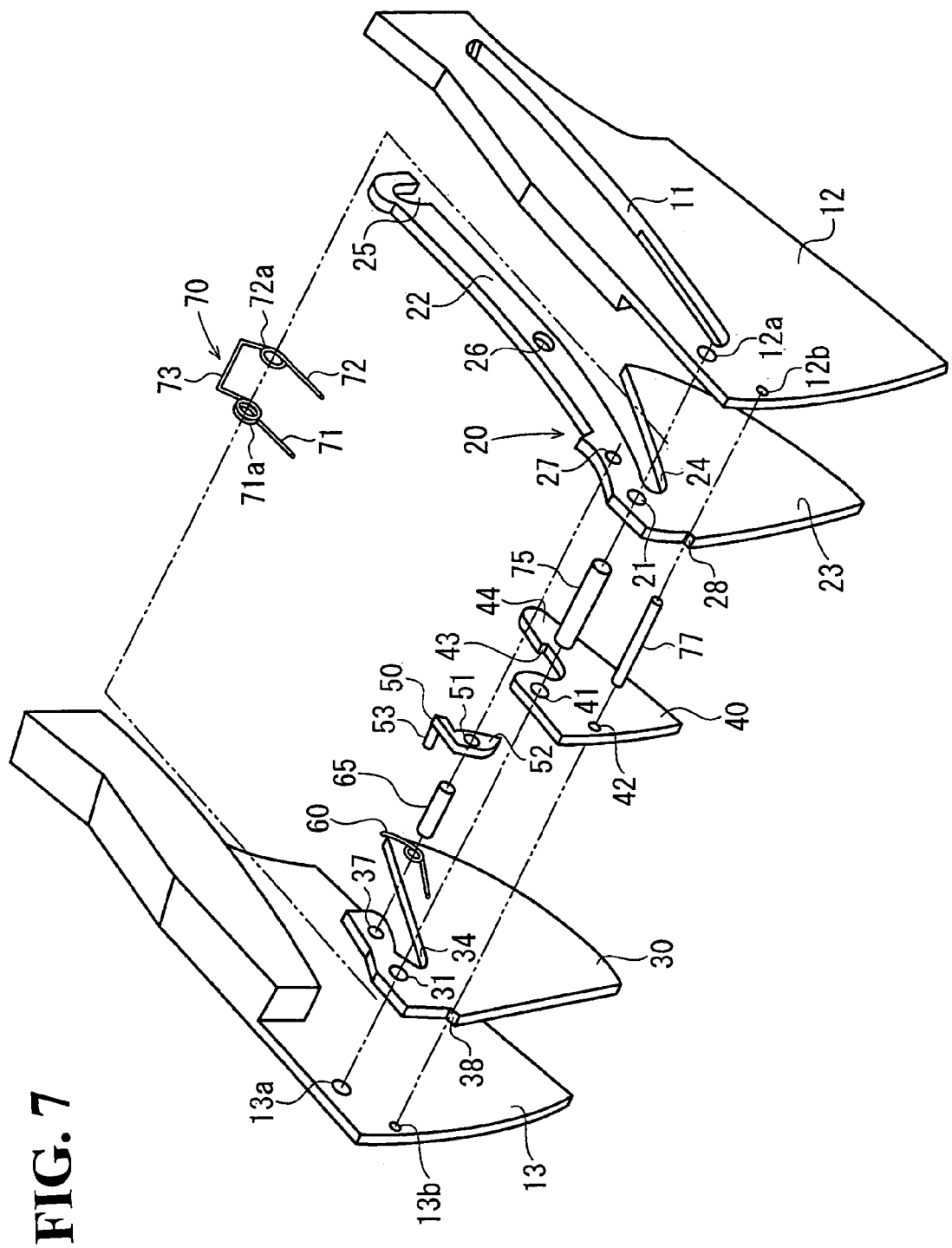
FIG. 7 is an exploded view of the locking unit, according to FIG. 1.
Figure 8:
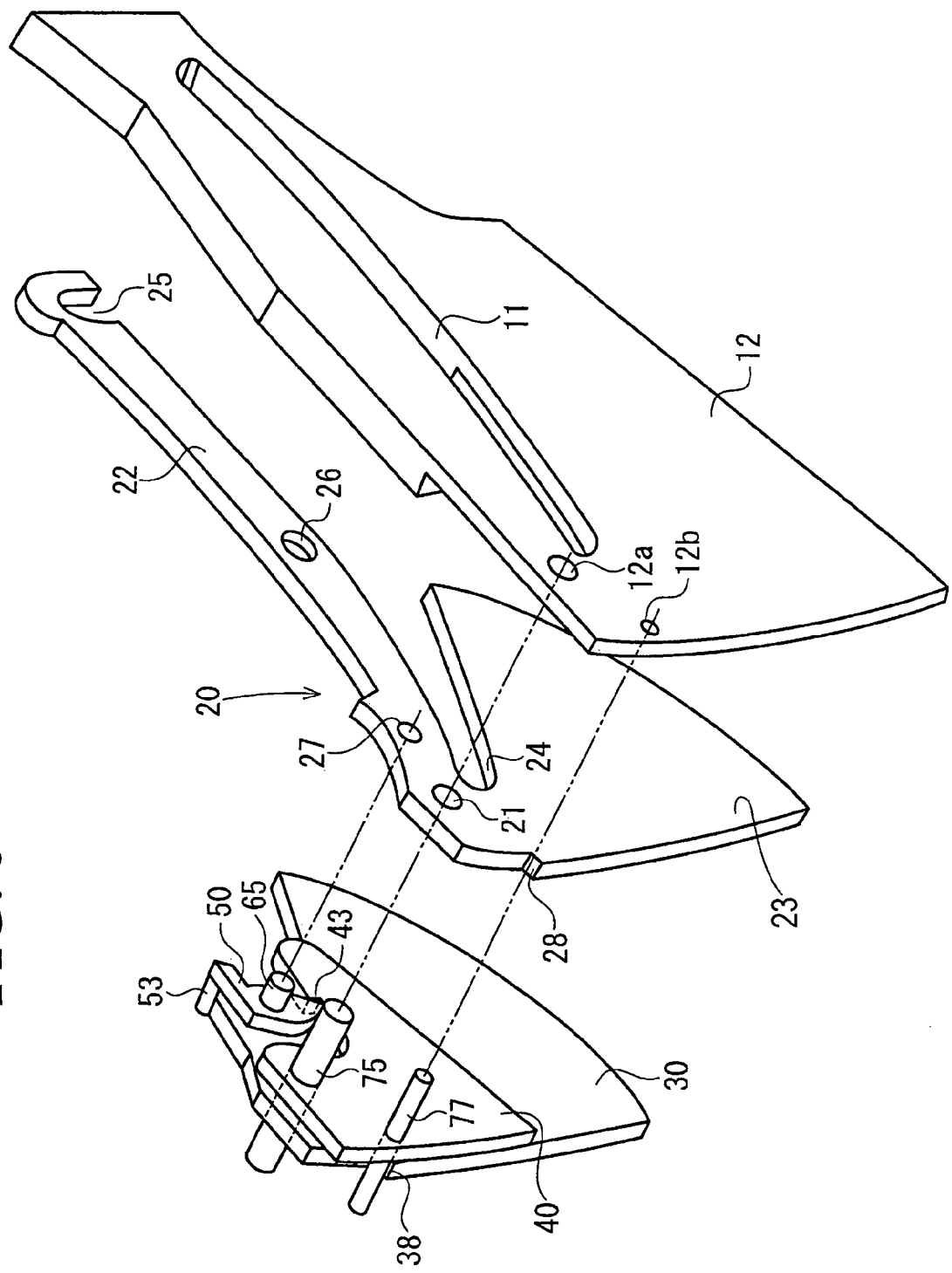
FIG. 8 is another exploded view of the locking unit, according to FIG. 1.
Figure 9:
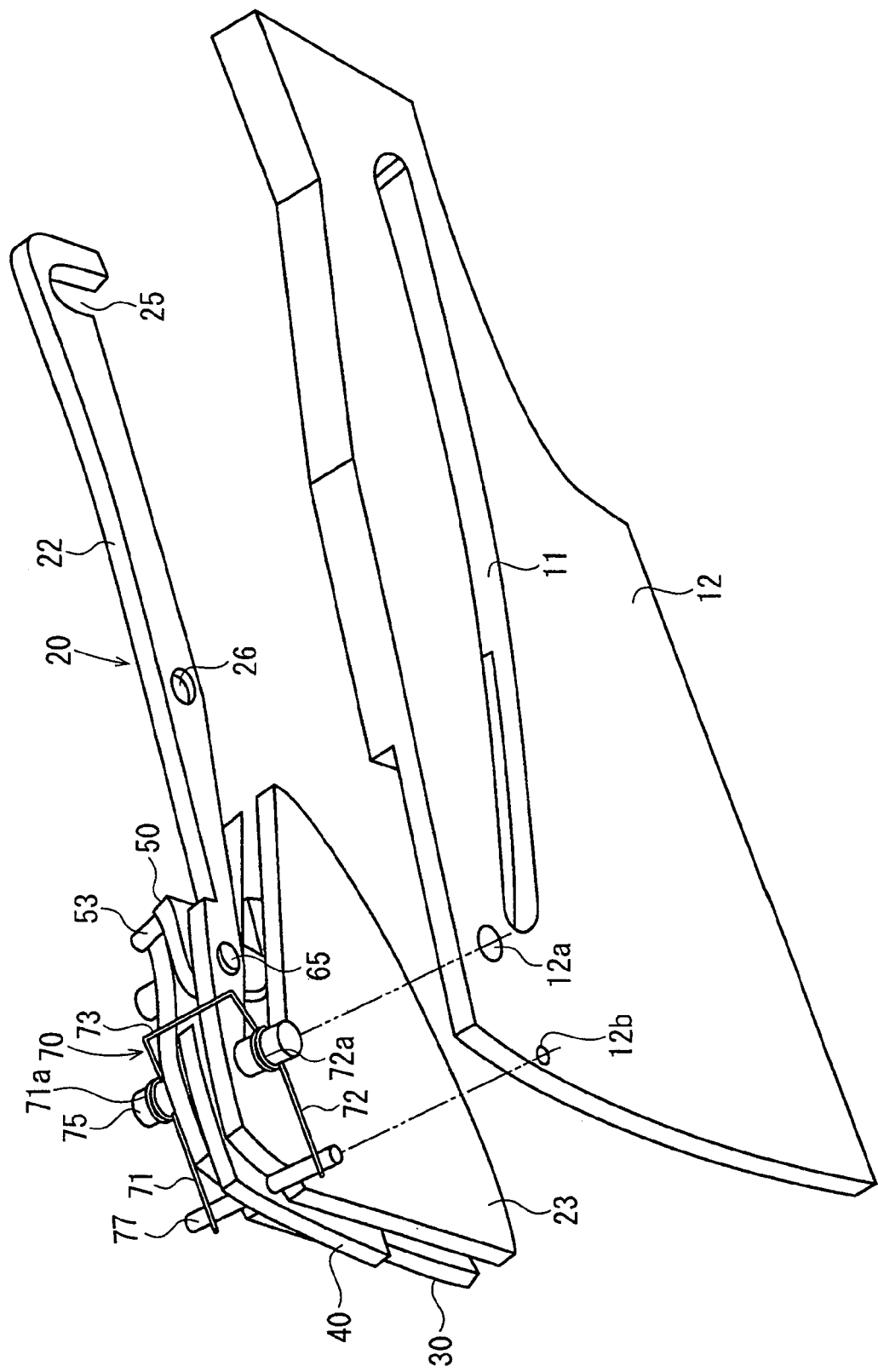
FIG. 9 is another exploded view of the locking unit, according to FIG. 1.
Figure 10A:
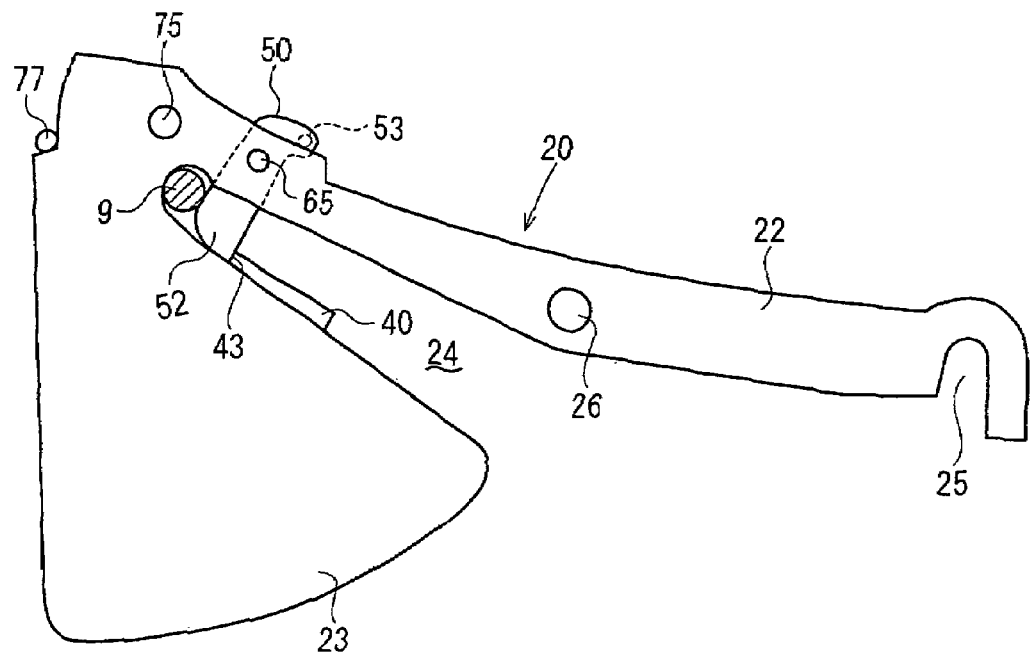
FIGS. 10(a) and 10(b) illustrate motions of the locking unit.
Figure 10B:
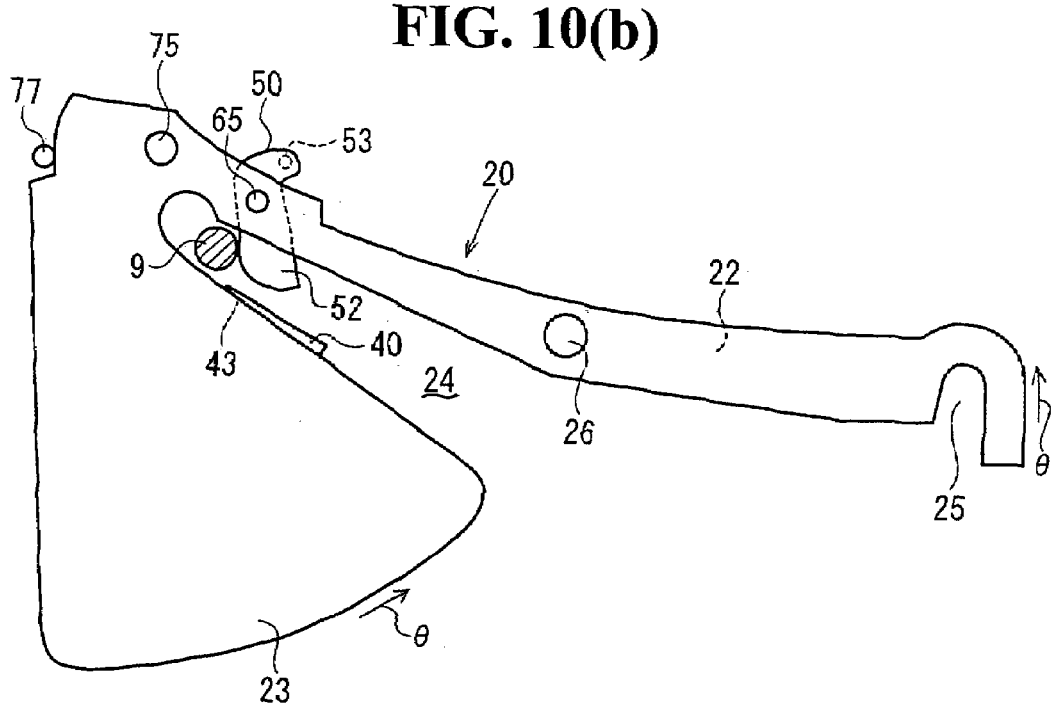
Figure 11:
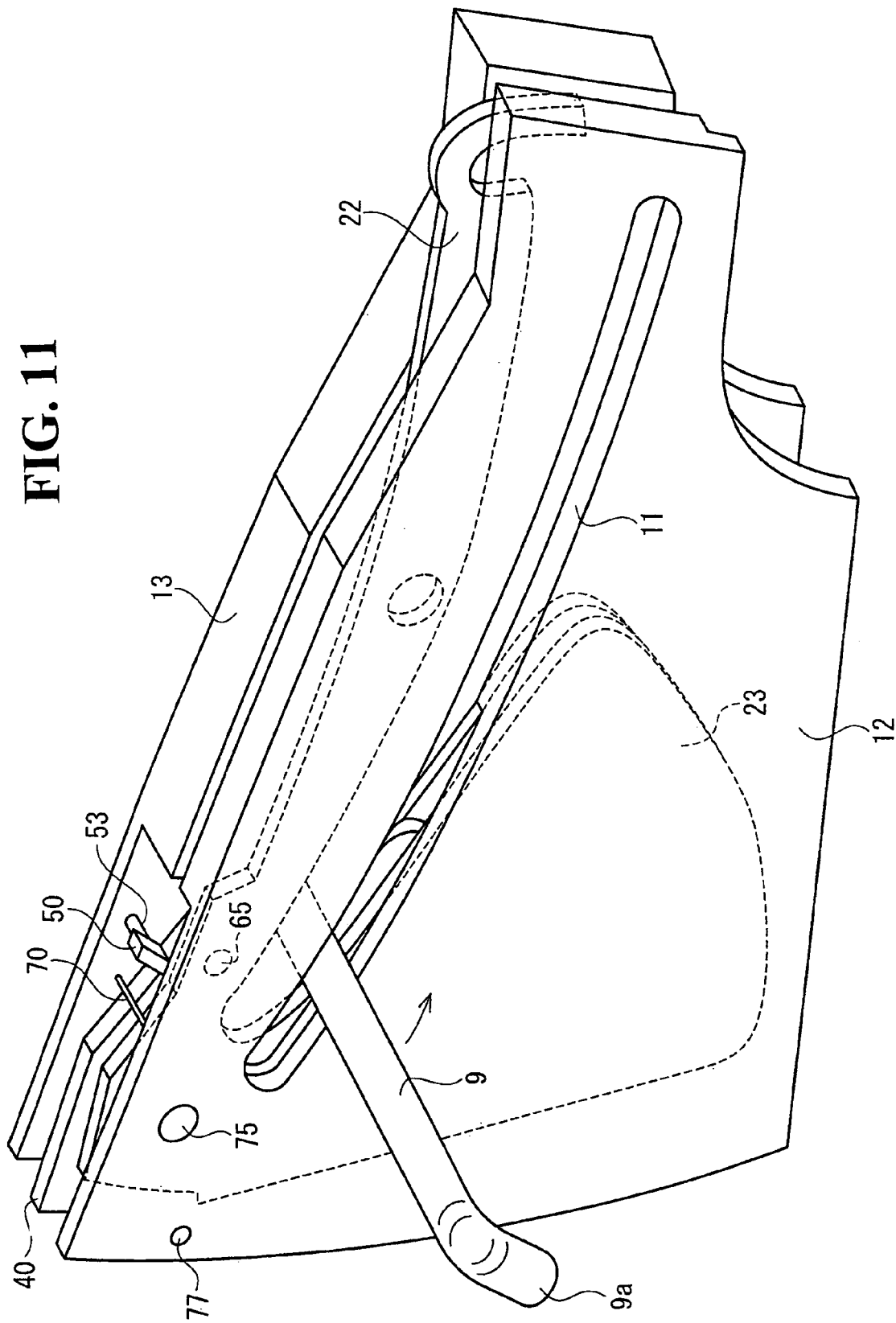
FIG. 11 is a perspective view of the locking unit when the locking bar starts moving.

FIG. 1 is a perspective view of a child car seat according to an embodiment. FIGS. 2(a), 2(b), and 2(c) are side views illustrating reclining motions of a seat body. FIG. 3 is a bottom perspective view of the child car seat excluding left part of a base. FIG. 4 is a partly enlarged view of the child car seat shown in FIG. 3 excluding a bottom cover of an operation unit. FIG. 5 is a perspective view illustrating an engaging state of the base and a locking bar of the seat body. FIG. 6 is a perspective view illustrating an engaging state of a locking unit and the locking bar. FIGS. 7, 8, and 9 are exploded views of the locking unit. FIGS. 10(a) and 10(b) illustrate motions of the locking unit; and FIG. 11 is a perspective view of the locking unit when the locking bar starts moving.

As shown in FIG. 1, a child car seat 1 includes a seat body 2 in which a child sits and a base 3 supporting the seat body 2 so as to be reclinable. FIGS. 2(a), 2(b), and 2(c) illustrate states of reclining motions of the seat body 2. The seat body 2 is positioned upright in FIG. 2(a) and is in a fully reclined position in FIG. 2(c). The seat body 2 is in a half reclining position in FIG. 2(b).

An operation unit 5 for changing the reclining state is disposed at the bottom of the seat body 2, and the reclining state of the seat body 2 can be adjusted by operating a handle 4 exposed in front of the operation unit 5.

As shown in FIGS. 3 and 4, locking bars 9 protrude from the left and right surfaces of the operation unit 5. First ends of the locking bars 9 are fitted into slots 11 extending in the front-back direction at side surfaces of a bottom base 3A. The locking bars 9 are disposed inside the bottom base 3A, and locked at predetermined positions by locking units 10.

The handle 4 is a plate extending in the front-back direction, and is urged in a retracting direction (a direction opposite to an arrow F1 shown in FIG. 4) by a return spring 4a. A pair of slots 4b, which forms a truncated chevron whose ends adjacent to the rear are closer to each other than those adjacent to the front, are open in the rear portion of the handle 4. Second ends 9a of the locking bars 9 are L-shaped, and are fitted in the slots 4b. Therefore, when the handle 4 is pulled in the F1 direction, the locking bars 9 advance toward each other along F2 and /–F2 directions. Although the first ends of the locking bars 9 are locked inside the corresponding locking units 10, the lock is released when the locking bars 9 are retracted in the F2 and –F2 directions, and the locking bars 9 can move along the slots 11.

FIG. 5 illustrates the layout of the operation unit 5, the locking bars 9, and one of the locking units 10 when the locking bars 9 are moved to the fully reclined position along the slots 11. Moreover, FIG. 6 illustrates the locking unit 10 and the corresponding locking bar 9 at this time.

Figure 2:
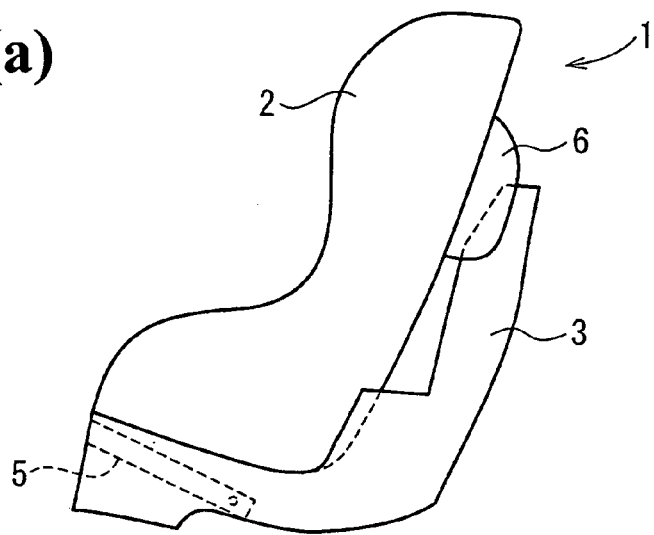
FIGS. 2(a), 2(b), and 2(c) are side views illustrating reclining motions of a car seat according to FIG. 1.
Figure 2:
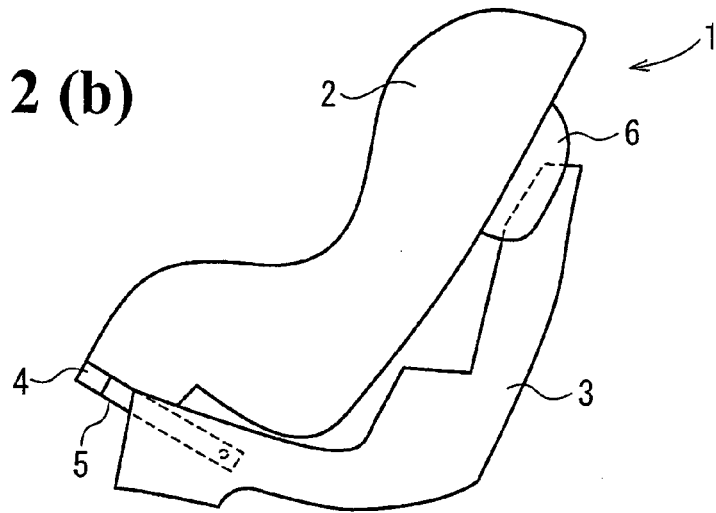
Figure 2:
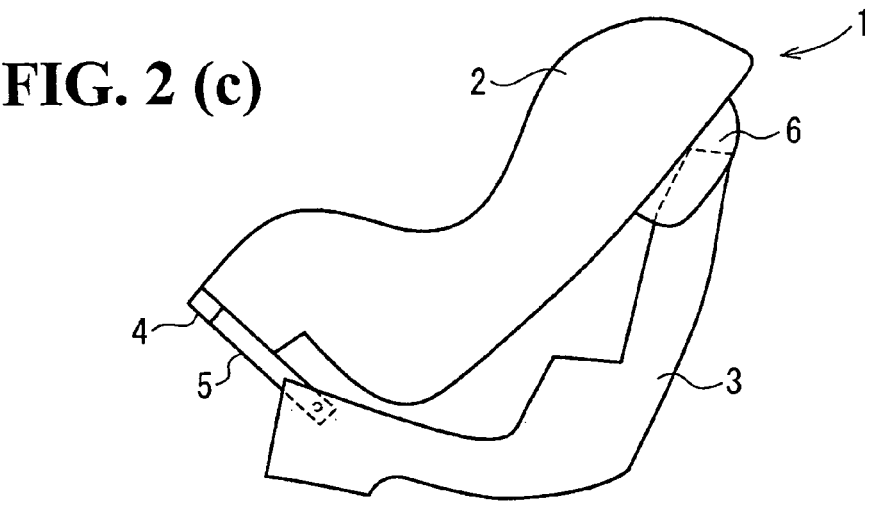
Figure 3:
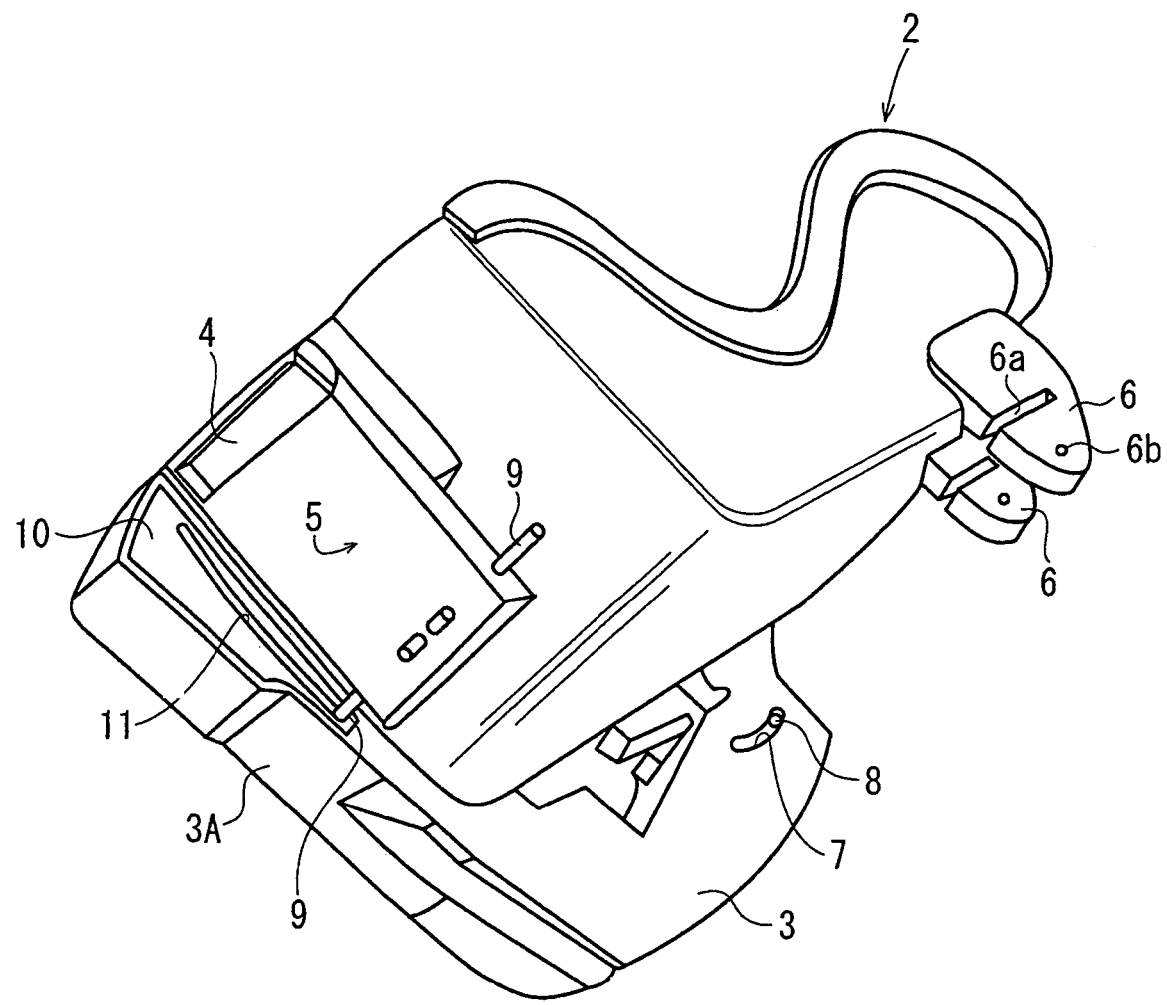
FIG. 3 is a bottom perspective view of the child car seat according to FIG. 1 excluding a left part of a base.

As shown in FIGS. 2(a) to 3, projecting blocks 6 are disposed at the left and right of the back of the backrest of the seat body 2. The projecting blocks 6 each have a slit 6a into which a seatbelt webbing for an adult is fitted and a hole 6b into which a guide pin 8 is fitted. A lock-off device (not shown) for fixing the webbing is also fitted into this slit 6a. The guide pins 8 are engaged with vertically extending guide slots 7 formed in upper portions of the base 3. When the seat body 2 moves in a reclining direction, the guide pins 8 move inside the guide slots 7.

The structure of the locking unit 10 will now be described with reference to FIGS. 7 to 9.

The locking unit 10 includes a side plate 12 serving as an inner surface of the bottom base 3A and a side plate 13 serving as an outer surface of the bottom base 3A; and a latch body 20, an auxiliary weight 30, a fixed plate 40, a latch claw 50, and the like are disposed between these side plates 12 and 13. The side plates 12 and 13 are substantially quadrangular plates extending in the front-back direction of the bottom base 3A, and the side plate 12 has the slot 11. The side plate 12 has two pin holes 12a and 12b, and the side plate 13 has two pin holes 13a and 13b.

The latch body 20 includes an arm 22 and a weight 23 connected so as to form an substantial L shape. A through-hole 21 for a pivot pin 75 is formed adjacent to the connecting portion of the arm 22 and the weight 23. The weight 23 is located below the through-hole 21, and the arm 22 extends from the through-hole 21 in the substantially horizontal direction.

A slit 24 for receiving the locking bar 9 is formed between the arm 22 and the weight 23. The arm 22 has a catching groove 25 for the locking bar 9 at the end and a catching hole 26 for the locking bar 9 in the middle portion. A through-hole 27 for a claw-supporting pin 65 is formed adjacent to the base end of the arm 22. A shoulder 28 for a stopper is formed at an upper portion of the side edge of the weight 23.

The auxiliary weight 30 has a shape similar to that of the latch body 20 excluding most of the arm 22. The auxiliary weight 30 has a slit 34 having the same shape as the slit 24 disposed at a position overlapping the slit 24, through-holes 31 and 37 disposed at positions overlapping with the through-holes 21 and 27, and a shoulder 38 disposed at a position overlapping the shoulder 28. The heights of the shoulders 28 and 38 correspond to those of the lower edges of the pin hole 12b of the side plate 12 and the pin hole 13b of the side plate 13.

Moreover, the through-hole 21, the through-hole 31, and a through-hole 41 of the fixed plate 40 described below are disposed coaxially with the pin holes 12a and 13a of the side plates 12 and 13, respectively.

The fixed plate 40 is disposed between the latch body 20 and the auxiliary weight 30, and has the through-hole 41 for the pivot pin 75 and a through-hole 42 for a tie pin 77. The through-hole 42 is coaxial with the pin holes 12b and 13b of the side plates 12 and 13, respectively.

The fixed plate 40 includes an extending portion 44 extending along the lower edges of the slits 24 and 34 of the weight 23 and the auxiliary weight 30, respectively. The extending portion 44 has a stepped stopper portion 43 at a predetermined position. The height of the stopper portion 43 adjacent to the through-hole 41 is lower than that remote from the through-hole 41.

The latch claw 50 is disposed over the extending portion 44. This latch claw 50 has a through-hole 51 for the claw-supporting pin 65 in the center, and a claw 52 extends downward from the through-hole 51. A pin-shaped protrusion 53 protrudes from the side of the latch claw 50 opposite to the claw 52 across the through-hole 51 so as to be parallel with the claw-supporting pin 65. This protrusion 53 extends to the upper side of the auxiliary weight 30.

The claw-supporting pin 65 is fitted into the through-hole 51, and both ends thereof are fitted into the through-hole 37 of the auxiliary weight 30 and the through-hole 27 of the latch body 20.

A helical spring 60 is wound around the claw-supporting pin 65. One end of the helical spring 60 is hooked on the upper side of the protrusion 53, and the other end is hooked on the upper side of the pivot pin 75. In this state, the claw 52 is in contact with the stopper portion 43 of the fixed plate 40 as shown in FIG. 8.

Herein, FIG. 7 illustrates an exploded diagram of the above-described components, FIG. 8 illustrates a state where the auxiliary weight 30, the fixed plate 40, and the latch claw 50 are assembled, and FIG. 9 illustrates a state where the latch body 20 and a spring 70 are further incorporated into those components.

The spring 70 is of a double helical type, and includes two coaxial helical portions 71a and 72a, parallel bars 71 and 72, and an angular U-shaped portion 73 connecting the helical portions 71a and 72a.

As shown in FIGS. 8 and 9, the pivot pin 75 is fitted into the through-holes 31, 41, and 21 of the auxiliary weight 30, the fixed plate 40, and the latch body 20, respectively. As shown in FIG. 9, the helical portion 71a of the spring 70 is fitted onto one end of the pivot pin 75 protruding from the auxiliary weight 30, and the helical portion 72a of the spring 70 is fitted onto the other end of the pivot pin 75 protruding from the latch body 20.

The bars 71 and 72 of the spring 70 are hooked on the upper side of the tie pin 77, and the U-shaped portion 73 is in elastic contact with the upper sides of the latch body 20 and the auxiliary weight 30.

As shown in FIG. 9, the latch body 20, the fixed plate 40, the auxiliary weight 30, and the latch claw 50 are assembled together with the pivot pin 75, the tie pin 77, and the claw-supporting pin 65; and then the side plates 12 and 13 disposed at either side of the above-described components are incorporated into the components by fitting the pivot pin 75 into the pin holes 12a and 13a and by fitting the tie pin 77 into the pin holes 12b and 13b. In this manner, the locking unit 10 shown in FIG. 6 is completed.

FIG. 10(a) illustrates a state where the locking bar 9 is locked by the locking unit 10 while the seat body 2 is fully reclined; and FIGS. 10(b) and 11 illustrate a state immediately after the lock is released.

As shown in FIG. 10(a), the locking bar 9 is disposed at the innermost positions in the slits 24 and 34 while the seat body 2 is fully reclined. The claw 52 of the latch claw 50 is in contact with the stopper portion 43 while pressing the side of the locking bar 9. Therefore, the locking bar 9 cannot move in either of the transverse directions of FIG. 10(a).

The state of the child car seat 1 at this time is shown in FIG. 2(c), and the engaging state of the locking bar 9 and the locking unit 10 is shown in FIGS. 5 and 6 as perspective views.

The child car seat 1 having the above-described structure is mounted so as to face backward on a car seat and fixed with a webbing for an adult. This webbing is fitted into the lock-off devices (not shown) disposed on the projecting blocks 6.

Even if the latch is released when the seat body 2 is pressed excessively strongly and suddenly while the child car seat 1 is mounted or when the child car seat 1 is dropped on a concrete floor, the locking bars 9 can be latched again by pulling the handle 4 as described below.

When forward (rightward in FIGS. 10(a) and 10(b)) force larger than a predetermined level is applied to the weight 23 and the auxiliary weight 30 from deceleration larger than a predetermined level generated by a frontal collision of a vehicle or the like, the latch body 20 and the auxiliary weight 30 are rotated around the pivot pin 75 in a θ direction shown in FIG. 10(b). Because the latch claw 50 is supported by the latch body 20 and the auxiliary weight 30 via the claw-supporting pin 65, the latch claw 50 moves upward in response to the rotation of the latch body 20 and the auxiliary weight 30 in the θ direction. The fixed plate 40 does not move because it is connected to the side plates 12 and 13 by the tie pin 77. Therefore, the claw 52 is separated from the stopper portion 43 in response to the upward transfer of the latch claw 50 as shown in FIG. 10(b). Since force in the forward direction of the vehicle is applied to the seat body 2 from the deceleration, the locking bar 9 moves rightward while pushing the claw 52 as shown in FIGS. 10(b) and 11. Thus, the seat body 2 is rotated in the upright direction so as to be positioned as shown in FIG. 2(a). As a result, the shock transmitted to a child sitting in the seat body 2 can be reduced.

At this time, because the webbing is locked by the lock-off devices, the rotational energy of the seat body 2 is absorbed such that the shock is reduced.

The catching groove 25 of the arm 22 is engaged with the first end of the locking bar 9 while the seat body 2 is in an upright position shown in FIG. 2(a). The catching hole 26 is engaged with the first end of the locking bar 9 while the seat body 2 is in a half reclining position shown in FIG. 2(b). The engagement of the first end of the locking bar 9 with the catching groove 25 or the catching hole 26 as described above can prevent the locking bar 9 from moving, and thus the seat body 2 is fixed on the base 3.

In order to adjust the reclining angle while the child car seat 1 is in any of the states shown in FIGS. 2(a), 2(b), and 2(c); the handle 4 is pulled in the F1 direction shown in FIG. 4. With this, the locking bars 9 are retracted in the F2 and −F2 directions, and the first ends of the locking bars 9 are released from the lock applied by the arms 22 so as to be movable inside the slots 11. The seat body 2 is then pushed in the upright direction or reclining direction so as to take any of the positions shown in FIGS. 2(a), 2(b), and 2(c). In any of these states, the locking bars 9 are engaged with the catching grooves 25, the catching holes 26, or the latch claws 50; and the seat body 2 is fixed on the base 3.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

The disclosure of Japanese Patent Application No. 2005-242896 filed on Aug. 24, 2005 is incorporated herein as a reference.

What is claimed is:

1. A child car seat comprising:
   a seat body;
   a base for supporting the seat body such that the seat body is tiltable in a reclining direction;
   a locking device for applying a lock preventing the seat body from tilting; and
   a releasing device for releasing the lock applied by the locking device and allowing a rotation of the seat body in an upright direction when forward deceleration larger than a predetermined level is applied to the child car seat while the seat body is disposed so as to face backward and upward, said releasing device comprising a weight moving forward in response to the deceleration so that the lock is released by movement of the weight, wherein the locking device comprises a locking bar extending in a transverse direction of the seat body, a latch body provided on the base and engaging the locking bar, and a latch claw rotatably attached to a latch arm so that engagement of the latch body and the locking bar through the latch claw is released by rotation of the latch claw in response to the movement of the weight caused by the deceleration.

2. The child car seat according to claim 1, further comprising a reciprocating device for reciprocating the locking bar in a longitudinal direction thereof, wherein the locking bar retracts to move from a position where the locking bar is engaged with the latch body to another position where the engagement of the locking bar and the latch body is released.

3. A child car seat comprising:
a seat body;
a base for supporting the seat body such that the seat body is tiltable in a reclining direction;
a locking device for applying a lock preventing the seat body from tilting; and
a releasing device for releasing the lock applied by the locking device and allowing a rotation of the seat body in an upright direction when forward deceleration larger than a predetermined level is applied to the child car seat while the seat body is disposed so as to face backward and upward, said releasing device comprising a weight moving forward in response to the deceleration so that the lock is released by movement of the weight,
wherein the locking device comprises a locking bar extending in a transverse direction of the seat body and a latch body provided on the base and engaging the locking bar so that engagement of the latch body and the locking bar is released in response to the movement of the weight caused by the deceleration, and a spring for urging the latch body in a direction so as to engage the locking bar.

4. A child car seat comprising:
a seat body;
a base for supporting the seat body such that the seat body is tiltable in a reclining direction;
a locking device for applying a lock preventing the seat body from tilting; and
a releasing device for releasing the lock applied by the locking device and allowing a rotation of the seat body in an upright direction when forward deceleration larger than a predetermined level is applied to the child car seat while the seat body is disposed so as to face backward and upward, said releasing device comprising a weight moving forward in response to the deceleration so that the lock is released by movement of the weight,
wherein the locking device comprises a locking bar extending in a transverse direction of the seat body and a latch body provided on the base and engaging the locking bar so that engagement of the latch body and the locking bar is released in response to the movement of the weight caused by the deceleration, and
wherein said latch body includes a latch arm, and the weight, as the releasing device, attached to one end of the latch arm with a space therebetween to which the locking bar is located in a reclining position of the seat body.

5. The child car seat according to claim 4, wherein said locking device further includes a latch claw rotatably attached to the latch arm, and a spring for urging the latch claw to intercept the space between the weight and the latch arm to hold the locking bar in the space.

6. The child car seat according to claim 5, wherein the weight is arranged so that when the deceleration is applied to the weight, the latch arm is moved upward to release the latch claw to allow the locking bar to move from the space.

* * * * *